(No Model.)

F. D. & J. S. MERCER.
HARVESTER BINDER.

No. 368,542. Patented Aug. 16, 1887.

Witnesses.
F. B. Fetherstonhaugh
Chas. H. Riches

Inventors.
F. D. Mercer
J. S. Mercer
by Donald C. Ridout & Co
Attys

UNITED STATES PATENT OFFICE.

FREDERICK D. MERCER AND JOHN S. MERCER, OF DEREHAM, ONTARIO, CANADA.

HARVESTER-BINDER.

SPECIFICATION forming part of Letters Patent No. 368,542, dated August 16, 1887.

Application filed August 21, 1886. Serial No. 211,504. (No model.)

*To all whom it may concern:*

Be it known that we, FREDERICK DUNCAN MERCER, farmer, and JOHN SMITH MERCER, gentleman, both of the township of Dereham, in the county of Oxford, in the Province of Ontario, Canada, have jointly invented certain new and useful Improvements in Harvester-Binders, of which the following is a specification.

The object of the invention is to design an effective substitute for the elevating-apron used in a harvester-binder; and it consists, essentially, in providing a series of rakes, the rake-head of each rake being pivoted on an endless chain or band arranged to travel so that the rakes connected to it will convey the grain from the grain-table to the binding-table, simple devices being provided for the purpose of operating the rakes so that each will clear itself from the grain at the point where the latter is discharged onto the binding-table, the whole being arranged substantially as and for the purpose hereinafter more particularly explained.

Figure 1:
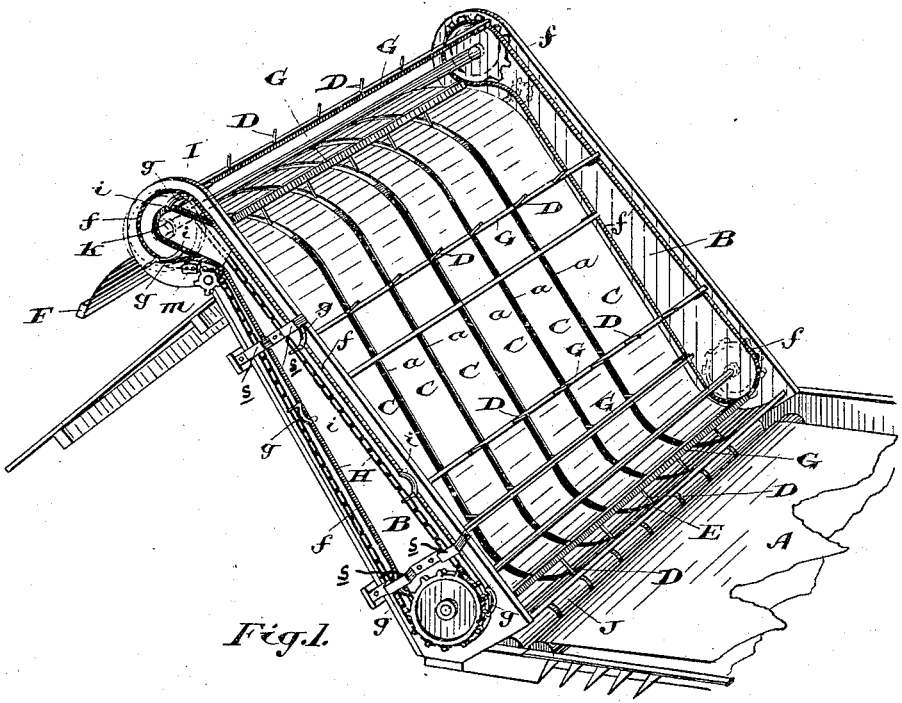
Figures 2, 3, 4:
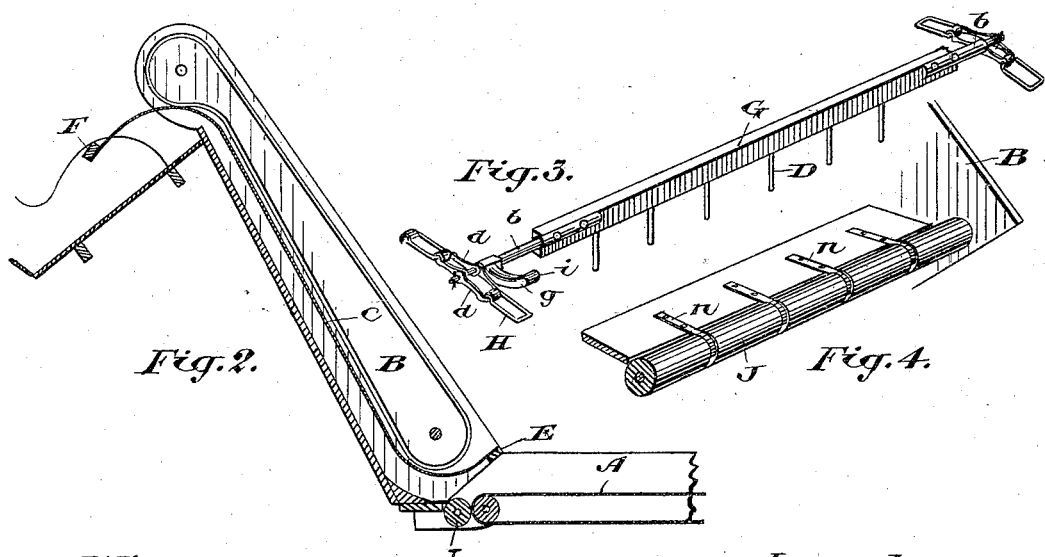

Figure 1 is a perspective view of a portion of a harvester-binder provided with our improved elevating device. Fig. 2 is a sectional elevation of the same. Fig. 3 is a detail of the rake, showing its connection with its operating-chain. Fig. 4 is a detail of the roller placed between the canvas of the grain-table and the deck of the elevator.

A represents a portion of the canvas of the grain-table.

B represents the sides of the elevator.

C represents the deck of the elevator, below which deck the grain is carried by the action of the rake-teeth D, which extend through slots $a$, made in the deck C, as indicated. The lower end of the deck C is attached to a cross-bar, E, which is connected to the sides B and forms a support for the lower end of the deck C. The upper end of the deck C is supported on a cross-bar, F. There being no other supports for the deck C, a free passage-way below it is left for the grain, and the teeth D meet with no obstruction while in motion. Each end of the rake-head G is provided with a spindle, $b$, which is designed to pass through the clevis-links $d$ and form one of the bars of the sprocket-chains H, one at each end. Each spindle $b$ passes through an endless slot, $f$, made in the sides B. These slots are shaped substantially as shown in the drawings, and are designed to form ways to support and guide the rake-heads G.

$s$ are straps which secure together the two parts of each side piece, B, formed by the slot $f$. These straps are arched to prevent their interference with the chains H, as clearly shown in Fig. 1.

At one end of each rake-head a small crank, $g$, is formed or attached to the spindle $b$, which crank is placed between the side B and sprocket chain H. The sprocket-chains pass over sprocket-wheels suitably journaled, one near the lower end of the deck and the other near the upper end thereof, as shown in Fig. 1. The crank end or pin $i$ projects into the slot $f$, from the outside, so that the teeth D are held at the proper angle during the time they are elevating the grain. When the rake-teeth D reach the top of the elevator, where the grain is discharged onto the binding-table, it is necessary to provide means for feathering the teeth D, so that they will clear themselves from the grain they have elevated. This feathering is accomplished by a grooved bracket, I, located on one side of the upper end of the elevator. The groove $k$ made in this bracket communicates with the slot $f$, substantially at the point where the small block $m$ is located, which is preferably of the form shown, with a rounded upper face, and is placed near the change in direction of the slot $f$, as shown in Fig. 1, so that the back of the crank $g$ will, when passing over the said block, be tilted so as to throw the pin $i$ into the groove $k$, which action will cause the rake-teeth to feather and clear themselves of the grain they have elevated. As the chain H continues to travel the spindle $b$ remains in the slot $f$, while the crank-pin $i$ travels in the groove $k$ and the rake-head G passes around the upper end of the elevator.

In order to feed the grain from the end of the canvas A to a point within the reach of the rake-teeth D, we place a revolving roller, J, at the inner end of the canvas A, below the lower end of the deck C, as shown in Figs. 1 and 2. A series of straps, $n$, fitted into grooves made in the roller J, bridge the opening between the said roller and the bottom plate of the elevator-frame.

It will of course be understood that when the crank-pin $i$ arrives at the end of the groove $k$ it will re-enter the slot $f$.

It will be noticed that the slot $f$ at the upper end of the elevator dips toward the binding-table of the machine, and that the dip is also given to the groove $k$. This dip imparts a better feather to the rake-teeth than would be secured were there no dip, and the grain is also better discharged from the elevator.

What we claim as our invention is—

1. In a harvester-binder, a series of rake-teeth, D, fixed to the rake-head G, having spindles $b$, designed to pass through the endless slots $f$, made in the elevator-sides B, in combination with suitable sprocket-wheels arranged outside said sides, and the traveling endless sprocket chain or band H, connected to the spindle $b$, substantially as and for the purpose specified.

2. In a harvester-binder, a series of rake-teeth, D, arranged to project through slots $a$, made in the deck C, and fixed to the rake-head G, having spindles $b$, designed to pass through the endless slots $f$, made in the elevator-sides B, in combination with suitable sprocket-wheels arranged outside said sides, and the traveling endless sprocket chain or band H, connected to the spindle $b$, substantially as and for the purpose specified.

3. In a harvester-binder, a series of rake-teeth, D, fixed to the rake-head G, having spindles $b$, designed to pass through the endless slots $f$, made in the elevator-sides B, the crank $g$, fixed to the spindle $b$, and having the crank end or pin $i$ formed on its end and designed to re-enter the slot $f$, in combination with suitable sprocket-wheels arranged outside said sides, and the traveling endless chain or band H, groove $k$, and block $m$, arranged substantially as and for the purpose specified.

4. In a harvester-binder, a series of rake-teeth, D, fixed to the rake-head G, having spindles $b$, designed to pass through the endless slot $f$, made in the elevator-sides B, the crank $g$, fixed to the spindle $b$, and having the crank end or pin $i$ formed on its end and designed to re-enter the slot $f$, in combination with sprocket-wheels arranged at the ends of the rake-heads outside the elevator-sides, the traveling endless chain or band H, arranged to carry the rake-heads, the block $m$, designed to tilt the crank $g$, so as to throw its end $i$ into the groove $k$, the dip in the slot $f$, and groove $k$ to tilt the rake-head, so as to discharge the grain toward the binding-table.

Signed at the city of Toronto this 11th day of August, 1886.

FRED. D. MERCER.
J. S. MERCER.

In presence of—
CHARLES C. BALDWIN,
CHAS. H. RICHES.